Feb. 25, 1969    C. E. FARNUM    3,429,608
KNOCKDOWN TRAILER UNIT

Filed Jan. 23, 1967    Sheet 1 of 4

INVENTOR
C. Ernest Farnum
BY
ATTORNEY

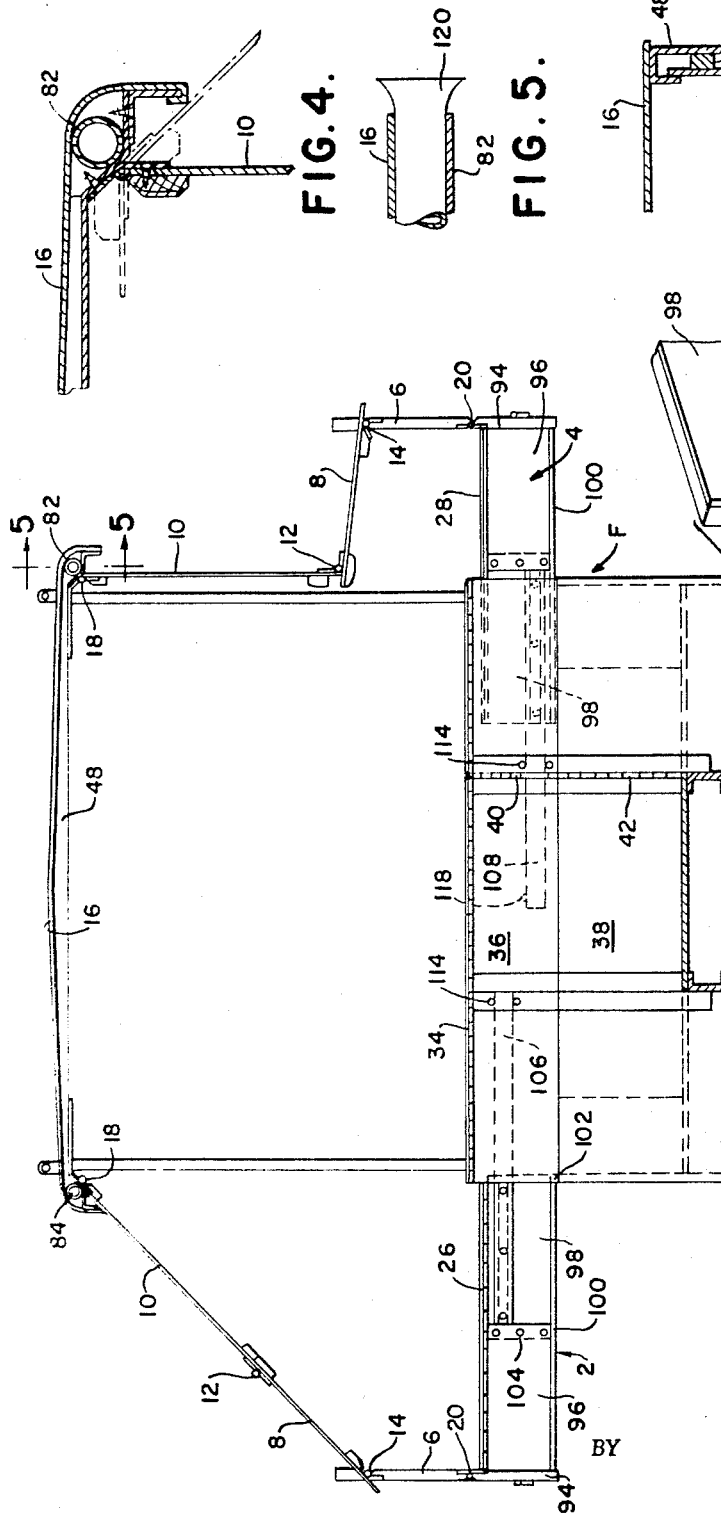
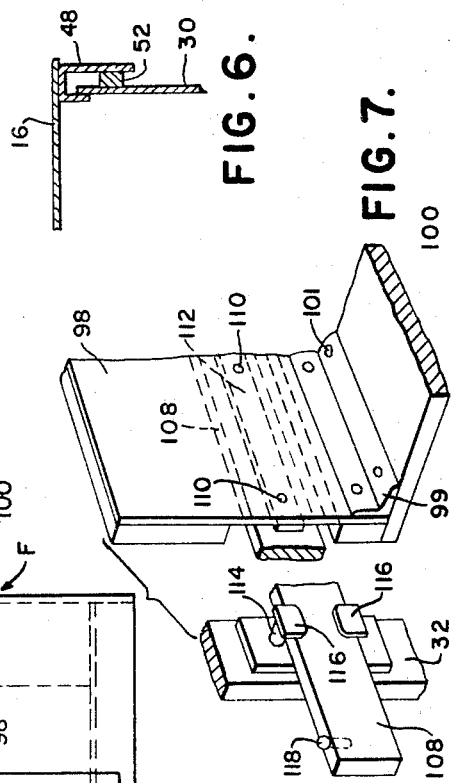
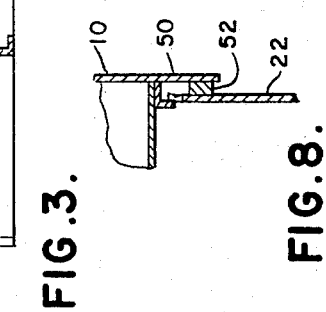

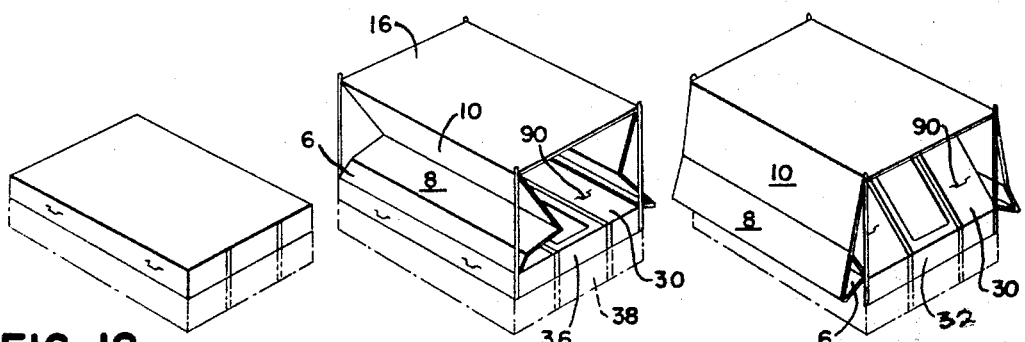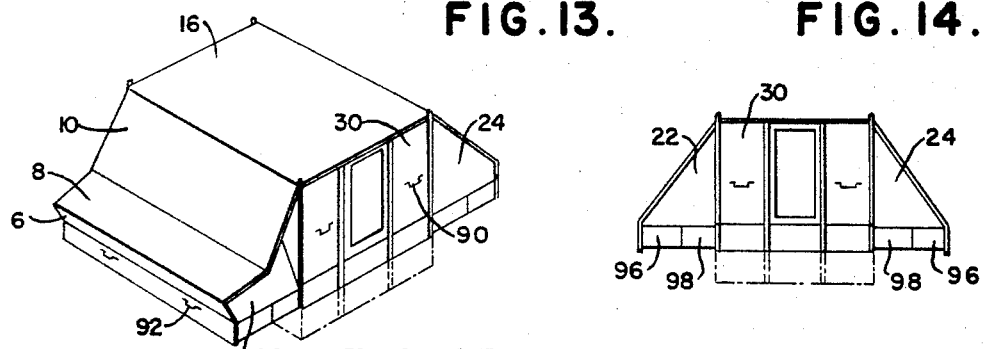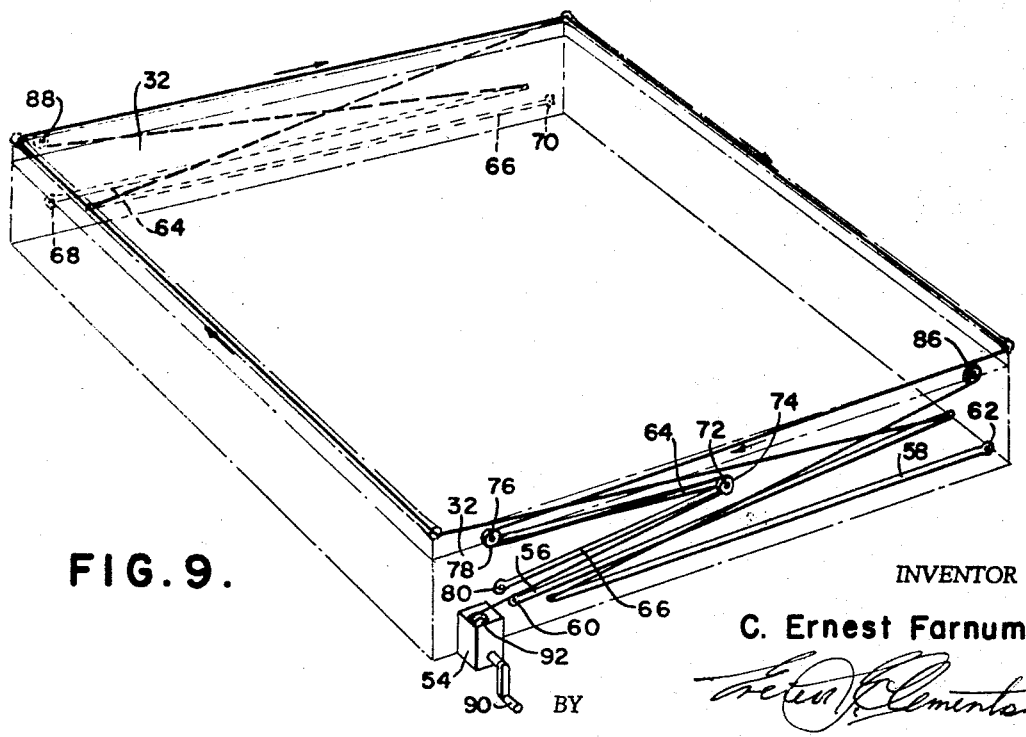

United States Patent Office 3,429,608
Patented Feb. 25, 1969

3,429,608
KNOCKDOWN TRAILER UNIT
Charles Ernest Farnum, 1375 9th Ave. N.,
Fargo, N. Dak. 58102
Filed Jan. 23, 1967, Ser. No. 611,131
U.S. Cl. 296—23                10 Claims
Int. Cl. B60p *3/34;* B60r *15/00*

ABSTRACT OF THE DISCLOSURE

A camper unit which can be carried on a trailer or truck in a collapsed condition to provide a small easily transportable package but which can be quickly set up by a single person using an attached winch and cable. The roof and sidewalls are arranged to interlock, on setting up, with the end walls to provide a sturdy structure. The bunks which provide sleeping comfort are connected to the sidewalls and base and are a permanent part of the structure.

The invention

Camping units are known which can be assembled and disassembled from parts when desired but in the main require separate handling of the parts in the assembly of a framework and a canvas or similar envelope mounted thereon. This type of unit presents a distasteful chore to assemble under adverse conditions and consumes much time as well. Furthermore, such units do not afford protection from animals and usually only a minimum amount of protection from the weather. There are also known units which are made of hinged panel sections but these units must be removed from the transporting trailer and separately set up and used on the ground or must obtain some auxiliary support from the ground or otherwise if used without removal from the trailer. With either type of aforementioned unit the added use of adequate bedding is a major problem.

It is an object of this invention to provide a camper unit which can be quickly assembled from package form.

It is a further object of this invention to provide a collapsible unit as aforsaid which is sufficiently sturdy when installed to provide protection from marauding animals and from the weather.

It is a further object of this invention to provide a camping unit as aforesaid which can be used as desired on the ground or on the transporting trailer or truck as an interconnected part thereof.

It is a further object of this invention to provide a camping unit when set up as aforesaid with protected, comfortable sleeping and living quarters.

It is a further object of this invention to provide a camping unit of interconnected, slidable and hinged members as aforesaid which can be collapsed mostly from a single point thereon to a small package for convenience of transportation and/or storage.

These and other objects of the invention will become manifest upon reading the following specification in conjunction with the accompanying drawings wherein:

FIG. 3 is a view showing the unit partially assembled apart from the trailer;

FIG. 4 is a detail of a panel connection to the roof;

FIG. 5 is an enlarged detail view of one of the flared ends of the conduits;

FIG. 6 is a view taken on the line 6—6 of FIG. 2;

FIG. 7 is an exploded view showing a detail of the bed frame support;

FIG. 8 is a view taken on the line 8—8 of FIG. 2;

FIG. 9 is a schematic view of the hoisting mechanism;

FIGS. 12–16 are views showing in diagrammatic form the various steps in the assembly of the unit.

Figure 1:
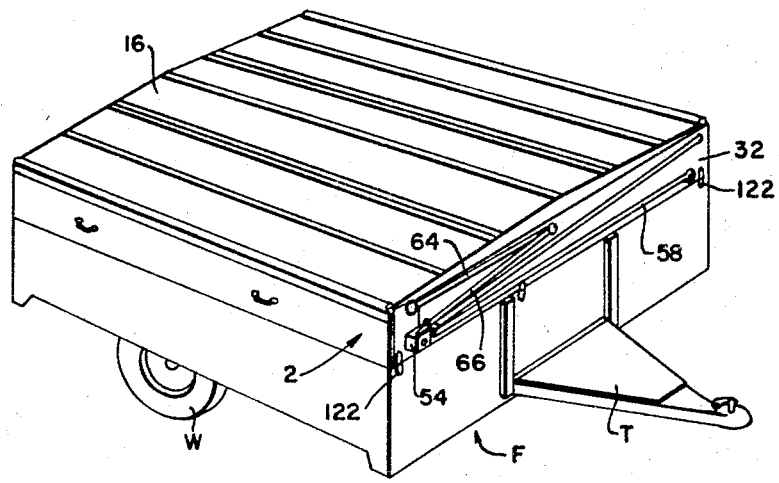
FIG. 1 is a view showing the camper unit in fully collapsed and protected condition and mounted on a carrying trailer.

In accordance with the invention the unit is built and supported or mounted on a rectangular base frame to which the several panels making up the unit are slidable, hinged and/or pivoted. A one piece generally rectangular roof member is hingedly mounted on the hinged side wall members and attached by cables to pivoted corner posts. A power winch mechanism includes a cable which is used to lift the roof and the hinged side panels from the package arrangement of FIG. 1 to the assembled position of FIG. 2. The raising of the entire assembly of hinged members and top can be completed by a single person in a short time and provides a sturdy structure for camp living as above pointed out.

General description

As shown in the drawings the unit comprises a generally rectangular base frame designated generally by the letter F. A pair of bed frames 2, 4 are slidably mounted in this frame like the mounting of drawers to be withdrawn from the stored position in the base frame F to the laterally extended positions shown in FIG. 2. A plurality of upper side panels 6, 8 and 10 are pivotally connected by hinges to each other as at 12 and 14 and are pivotally connected to the roof 16 and upper side edges of the bed frames 2 and 4 by hinges 18 and 20. A plurality of end panels 22 and 24 are pivotally connected to each upper end of each bed frame by hinges at 26 and 28 to move therewith. A pair of generally center end panels 30 are hingedly connected to the frame segments 32 at the ends of the main base frame by hinges 34. One of the center end panels 30 is provided with a door segment D while the opposite panel may be provided with a window if desired. The main frame is provided with pivoted segments 36 and 38 hinged to the main frame by hinges 40 and 42 and in alignment with the segment D to define an access door over the tongue. This location of the door allows the use of the tongue as a step.

Figure 10:
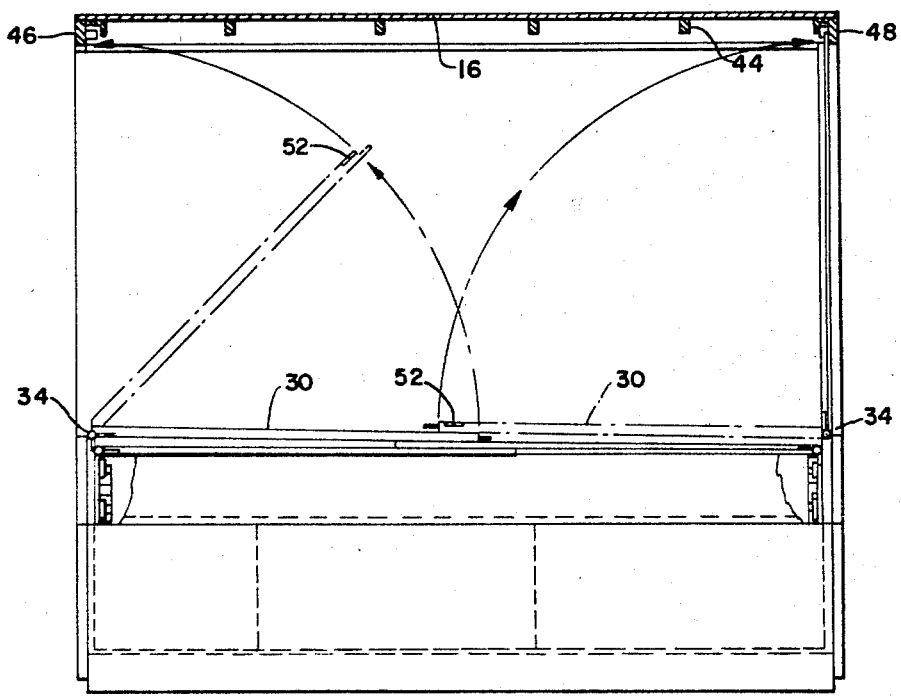
FIG. 10 is a longitudinal sectional view showing the folding of the center end walls over the beds.
Figure 11:
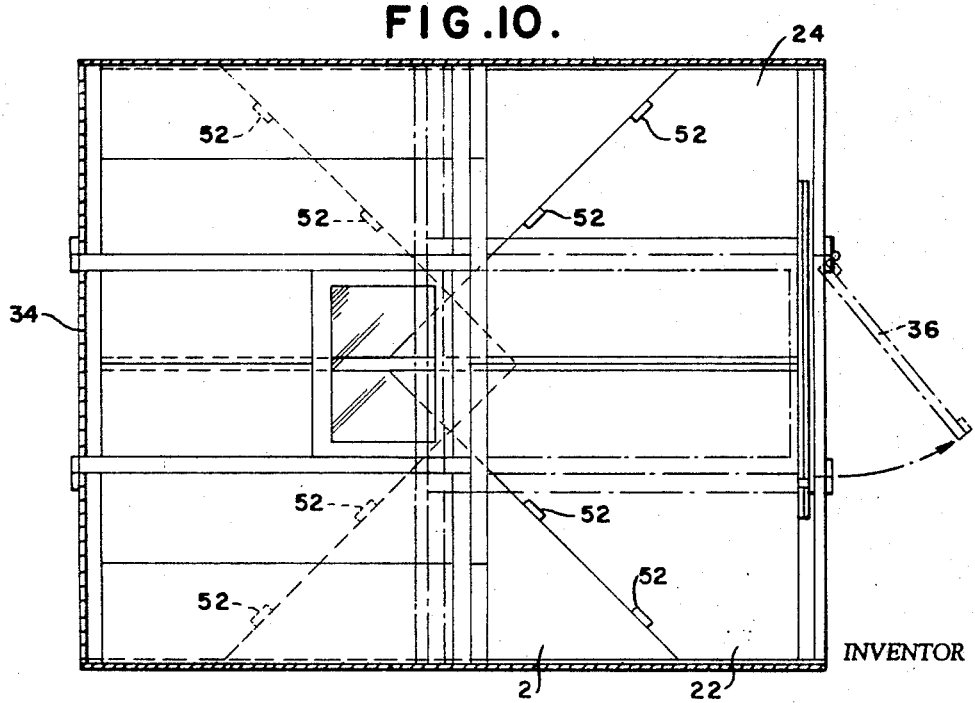
FIG. 11 is a similar view but showing lines where all parts are folded down and the door of an end panel is partially swung open.

The roof has secured thereto stiffening members 44 FIG. 10 and end channels 46 and 48 which are formed of a ferrous material. The side panels 8 and 10 are also provided at the free edges with ferrous members at 50. The free ends of the quarter panels, FIGS. 8 and 11, have magnets 52 secured thereto for a purpose to be explained below.

Figure 2:
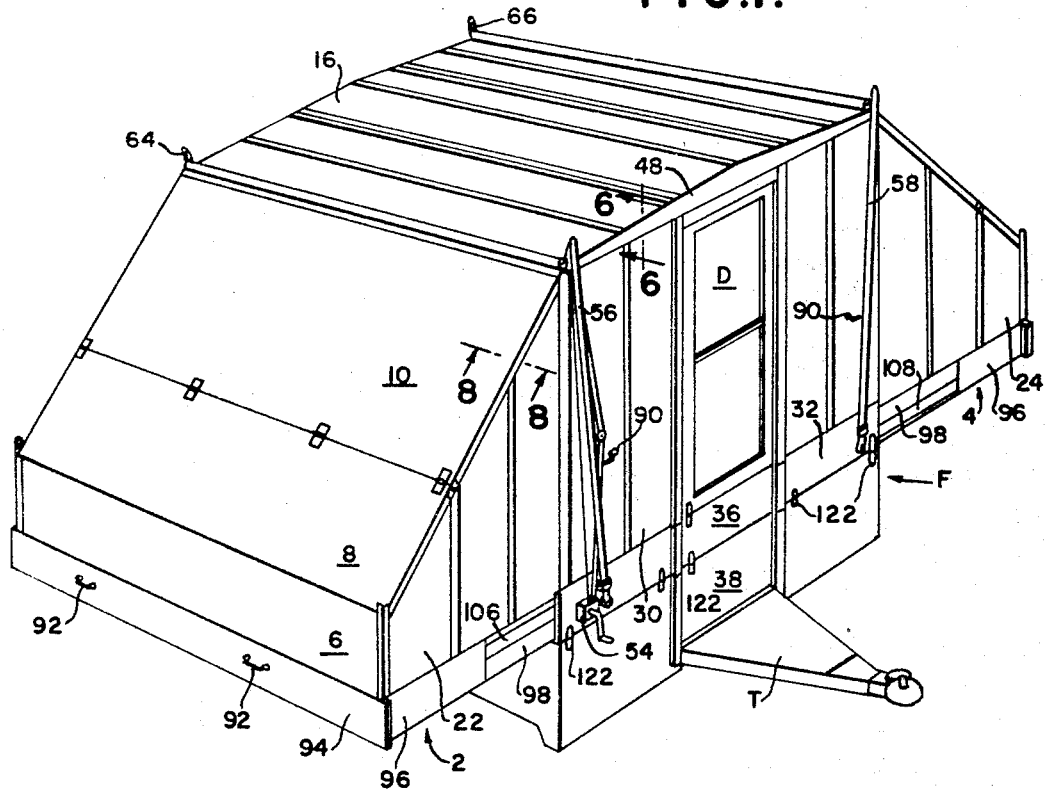
FIG. 2 is a view showing the unit assembled for use on a trailer.

A power winch mechanism is provided for lifting the roof from the packaged condition illustrated in FIG. 1 to the raised position shown in FIG. 2 in order to enable quick assembly of the unit. This mechanism is shown as including a hand powered winch 54 mounted on one end frame segment 32. A pair of corner posts 56 and 58 are pivotally mounted on the front of the main base frame at 60 and 62 and a pair of similar corner posts 64 and 66 are pivotally mounted on the rear end of the main frame at 68 and 70. A pair of arms 64 and 66 are pivotally connected together at 72 and carry a sheave 74 rotatably mounted on the pivot. Arm 64 is pivotally connected to the roof 16 at 76 and a sheave 78 is rotatably carried by the pivot. Arm 66 is pivotally connected to the main frame at 80. A main cable is trained about the winding drum of the winch and thence around sheaves 74 and 78, through conduit 82, then along the back of the unit, through a conduit 84 and fastened to the free end of corner post 56. A short length of cable is fastened to the free end of corner post 58 and is secured to the main cable after passing around a sheave 86 rotatably connected to the roof. A short length of cable is fastened to the free end of post 64 and to the main cable after passing around a sheave 88 rotatably connected to the roof. A short length of cable is connected to the free end of corner post 66 and to the main cable in conduit 82.

*Operation*

In operation the winch is operated by handle 90 to wind the main cable on the drum 92. The tension on the main cable will force the sheave 74 to the left while pulling all the short lengths of cable connected to the ends of the posts to lift the roof from the packaged condition shown in FIGS. 1 and 12 to the raised position illustrated in FIGS. 2 and 13. In these positions as shown the ratchet mechanism (not shown) of the winch will hold the roof in the illustrated position while the operator can reach in and fold the panels 6, 8 and 10 outward from the position shown in FIG. 13 to the position shown in FIG. 14. The operator then by pulling on the handles 90 of the front panel 30 pivots the panel about hinge 34 to raise it to the vertical position where it is held against the long leg of the channel by magnets 52. By entering the thus partially assembled unit the operator can then readily pivot the rear center panel 30 about its hinges 34 to the vertical position where it is held against the long leg of the rear channel by magnets 52. The operator next pulls on handles 92 to pull out the bed frames to the position illustrated in FIG. 15 and then raises the panels 22 and 24 to the vertical position where they are retained by magnets 52 against the long leg of the channels of the panels. Finally, the operator releases the ratchet mechanism and lowers the roof and the side panels to rest position where the panels fit between the legs of the channels and the bottoms of the channels rest on the panels. This interlocking of the panels and roof by the channels provides a sturdy structure.

*Details of construction*

The panels and roof may be formed of aluminum except for the channels which are of a ferrous material. However, plywood is also contemplated as a building material for the unit.

The bed frames comprise a side board 94, end boards 96, 98 and a bottom panel 100 connected to the side board and end boards 96, 98 as by angle irons 99 and fasteners 101. The bottom panels are substantially equal to one half the width of the main frame and can be pulled out of the frame a lesser distance than one half the width of the frame in order to be supported by the edge of the main frame as shown at 102. The end boards are connected to each other in overlapping relation by fasteners 104 and the sections 98 have supporting braces 106, 108 secured thereto on the outer end faces. The braces 106 are secured adjacent the upper edge of sections 98 while braces 108 are secured to the lower edge of sections 98 of the opposed bed frame whereby the braces will be one above the other when the frames are moved into packaged position. The braces are secured to sections 98 as by fasteners 110 and are maintained in spaced relation thereto by spacers 112. Guide members 114 having heads 116 in engagement with braces 108 are secured to panels 32 and serve to guide the bed frames in their sliding movement as well as supply additional stability thereto when the frames are extended. The movement of the braces in the guides is limited by stop members 118 abutting the guide members 114.

The ends of the conduits 82 and 84 are flared as at 120 to provide for the ease of sliding movement of the cables into and out of the conduits. The ends of the flared portions are in the same plane as the sheaves and the ends of the posts in order to provide for proper running of the cables without binding and without running off the sheaves.

In order to provide for removal from the trailer whereby the trailer may be used for other purposes there are provided a plurality of trunk catches 122 which can be quickly released to allow removal of the unit and which can be quickly engaged to securely hold the unit of the trailer.

I claim:

1. A camping unit comprising a main rectangular base frame, a pair of bed frames, means slidably mounting said bed frames in opposed sides of the main frame, a roof member, means for raising and supporting the roof member above the main frame, side panels of interconnected plural sections hingedly connected to the roof at opposite sides thereof and to the outboard side of the bed frames to form sloping side walls of the unit, end panels hingedly connected to the other opposed sides of the main base frame and to the opposite ends of the bed frames to form end walls of the unit, and means on the roof and panels for interlocking the end panels to the roof and side panels.

2. A unit as defined in claim 1 wherein the interlocking means comprises channels on the ends of the roof and the ends of the side panels receiving the ends of the end panels.

3. A unit as defined in claim 2 further including means for slidably holding the free ends of the end panels against a side of the channels.

4. A unit as defined in claim 3 wherein the channels are of a ferrous metal and the holding means are magnets secured to the ends of the end panels.

5. A camping unit as defined in claim 1 wherein each of said bed frames comprises end boards, side boards connected to each of the end boards to define the sides of the bed frames, and a bottom panel connected to said boards.

6. A camping unit as defined in claim 1 wherein the means for raising and lowering the roof comprises a pair of corner posts pivotally mounted on each end of said base frame, a first link pivotally connected to the roof, a second link pivotally connected to said base frame, a pulley, means pivotally connecting the free ends of the links and pivotally mounting the pulley, cable means connecting the free ends of the posts, the pulley, and the roof, and power winch means for winding the cable.

7. A unit as defined in claim 6 wherein the power winch means includes a cable wound thereon and extending through conduits mounted on opposite sides of said roof.

8. A unit as defined in claim 1 wherein a door segment is provided in one of the end panels.

9. A unit as defined in claim 8 further including wheels mounting the frame to thereby define a trailer, a tongue connected to the frame for connection to a tractor, and a door segment hingedly mounted in the frame over the tongue and in alignment with the door segment in the panel to provide an access door.

10. A camping unit as in claim 9 having a bottom frame and a tongue connected to said frame at one end thereof, a doorway extending upward through said one end of said base frame adjacent said tongue, and a step carried by said tongue.

References Cited

UNITED STATES PATENTS

| | | | |
|---|---|---|---|
| 2,710,977 | 6/1955 | Fannin | 296—23 X |
| 1,435,251 | 11/1922 | Moore | 296—23.2 |
| 2,483,332 | 9/1949 | Brumbaugh | 296—27 X |
| 3,323,778 | 6/1967 | Baker | 296—27 X |

PHILIP GOODMAN, *Primary Examiner.*

U.S. Cl. X.R.

52—66; 296—27